United States Patent
Tanibata

Patent Number: 5,337,117
Date of Patent: Aug. 9, 1994

[54] IMAGE COMBINING PRINTER

[75] Inventor: Tohru Tanibata, Wakayama, Japan

[73] Assignee: Noritsu Koki Co., Ltd., Wakayama, Japan

[21] Appl. No.: 59,974

[22] Filed: May 13, 1993

[51] Int. Cl.$^5$ .................. G03B 27/00; G03B 27/02; G03B 27/32

[52] U.S. Cl. .................................................. 355/19

[58] Field of Search ............... 355/326, 71, 100, 19

[56] References Cited

U.S. PATENT DOCUMENTS

| | | | |
|---|---|---|---|
| 2,118,894 | 5/1938 | Morrissey | 355/19 X |
| 3,688,656 | 9/1972 | Applequist et al. | 355/19 X |
| 3,966,317 | 6/1976 | Wacks et al. | 355/19 |
| 4,386,836 | 6/1983 | Aoki et al. | 355/71 X |
| 4,634,269 | 1/1987 | Welp et al. | 355/100 |
| 4,933,706 | 6/1990 | Abumehdi | 355/326 M |
| 4,963,918 | 10/1990 | Yoshihara | 355/19 |

FOREIGN PATENT DOCUMENTS 1-291236  11/1989  Japan .

*Primary Examiner*—Richard A. Wintercorn
*Attorney, Agent, or Firm*—Wenderoth, Lind & Ponack

[57] ABSTRACT

An image combining printer including: a photographic picture stationary surface exposure unit for exposing a photosensitive material to an image projected from a negative film by illumination of a light source, a stationary surface contact exposure unit for conducting a contact exposure on the photosensitive material which stops running and comes into direct contact with another negative, and a PLZT line exposure unit of a linear shape arranged at a right angle to a pass line of the photosensitive material for performing a line exposure so arranged so that the photosensitive material can be exposed to light in at least one, a selected two, or all three of the exposure units as desired.

1 Claim, 3 Drawing Sheets

IMAGE COMBINING PRINTER

BACKGROUND OF THE INVENTION

The present invention relates to an image combining printer and more particularly, to an image printer for combining photographic pictures with additional characters and symbols.

Some conventional image combining printers have been provided for producing e.g. picture post-cards or combination prints which contain photographic pictures and their relevant characters, symbols, and/or markings. For example, a known image combining printer incorporates a photographic printer equipped with a character printing device using lith-type negative films. A modified printer is provided in which the lith-type negatives are replaced by a CRT. Also, another modification is disclosed in Japanese Laid-open Patent Publication No.1-291236(1989) which includes a photo picture exposure unit and a line exposure unit for exposure to an optical image of characteristics or the like.

The disadvantage of such conventional printers using the lith-type negatives is that the production of the lith-type negatives is troublesome, taking a considerable length of time and thus increasing the cost of production facilities.

Also, the modified printer with a CRT is less efficient in its operation.

It is difficult for the image combining printer depicted in Patent Publication No.1-291236 to produce illustration-added prints such as picture post-cards with significant quality.

SUMMARY OF THE INVENTION

For overcoming the forgoing drawbacks, it is an object of the present invention to provide an image combining printer capable of performing highly efficient, high quality exposure operations.

An image combining printer according to the present invention comprises: a photographic picture stationary surface exposure unit for exposing a photosensitive material to an image projected from a negative film by illumination of a light source; a stationary surface contact exposure unit for conducting a contact exposure on the photosensitive material which stops running and comes into direct contact with another negative, and a PLZT line exposure unit of linear shape arranged at a right angle to the pass line of the photosensitive material for performing a line exposure. In operation, the photosensitive material can be exposed to light in at least one, a selected two, or all three of the exposure units as desired.

More specifically, the image combine printer of the present invention allows the photographic picture stationary surface exposure unit, the stationary surface contact exposure unit, and the PLZT line exposure unit to be activated selectively for producing an optimum exposure effect in accordance with the type of an object to be printed, e.g. characters or illustrations.

Also, when the photographic picture stationary surface exposure unit, the stationary surface contact exposure unit, and the PLZT line exposure unit all are used, the photosensitive material can be exposed at a maximum efficiency,

DESCRIPTION OF THE PREFERRED EMBODIMENT

Figure 1:
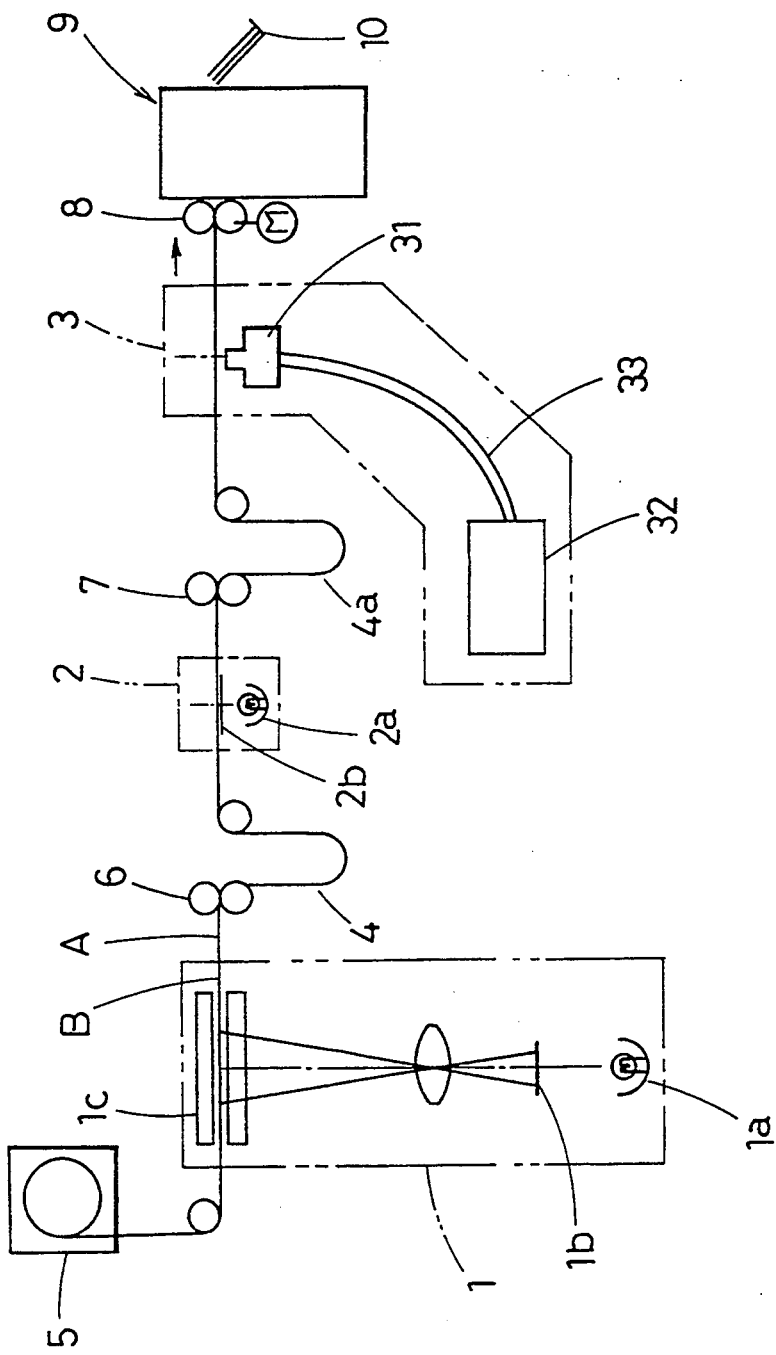
FIG. 1 is a schematic view of an image combining printer according to the present invention.

A preferred embodiment of the present invention will be described in the form of an image combining printer referring to the accompanying drawings.

A photographic picture stationary surface exposure unit 1, a stationary surface direct exposure unit 2, and a PLZT line exposure unit 3 are disposed in this order along the pass line B of a photosensitive material A as oriented towards the front.

The photographic picture stationary surface exposure unit 1 is arranged to expose the photosensitive material A placed stationarily on a first exposure station 1c to a photograph image A1 which is projected from a negative film 1b by illumination of a white lamp 1a.

The stationary surface contact exposure unit 2 allows the photosensitive material A to be placed directly over a lith-type negative film 2b and exposed to a lamp 2a for contact printing.

Accordingly, the photograph image A1 printed on the photosensitive material A at the photographic picture stationary surface exposure unit 1 is joined by an additional image A2 of e.g. another photo, characters, symbols, and markings (an illustration of Japanese rice cakes in the drawings) which is printed at the stationary surface contact exposure unit 2.

Figure 3:
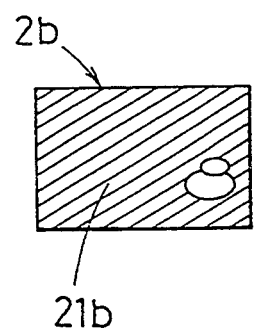
FIG. 3 is a front view of a lith-type negative film at the stationary surface contact exposure unit of the image combining printer of the present invention.
Figure 4:
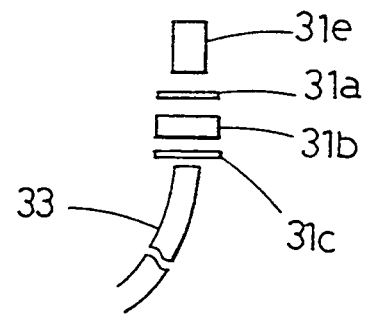
FIG. 4 is an exploded side view of a PLZT head of the PLZT line exposure unit of the image combining printer of the present invention.

FIG. 3 shows the lith-type negative film 2b in which the hatching represents a black color or opaque area 21b.

It is possible to replace the lith-type film 2b with a transparency (a transparent film base for OHP).

The PLZT line exposure unit 3 includes a PLZT head 31 of a linear shape extending at a right angle to the pass line of the photosensitive material A for exposure of the photo-sensitive material A. The PLZT head 31 is coupled to an optical fiber cable 33 through which light is transmitted from a light source 32 to the PLZT head 31.

Figure 5:
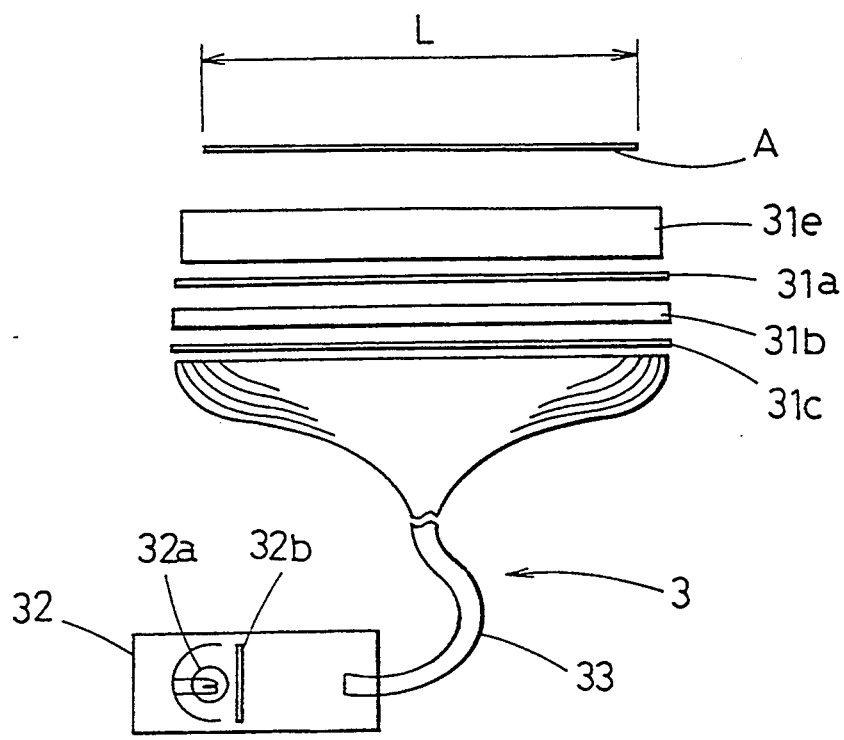
FIG. 5 is a schematic view showing the PLZT line exposure unit of the image combining printer of the present invention.

The light source 32 consists of a lamp 32a and a heat absorbing filter 32b arranged in front of the lamp 32a (FIG. 5). The PLZT head 31 comprises an analyzer 31a, a PLZT crystal 31b, and a polarizer 3c arranged in layers. The analyzer 31a is covered with a selfoc lens-eye 31e (FIG. 5). The PLZT crystal 31b is sandwiched between two electrodes (not shown). The width of the photosensitive material A is represented by the letter L as shown in FIG. 5.

The action of the PLZT head 31 is linked with the movement of a photosensitive material transfer motor M, thus performing an exposure action asynchronously of the stationary surface contact exposure unit 2.

Also, a loop of the photosensitive material A is arranged between the stationary surface contact exposure unit 2 and the PLZT line exposure unit 3 for allowing the stationary surface contact exposure unit 2 to perform an exposure operation asynchronously.

Accordingly, one or two of the three exposure units 1, 2, and 3 can selectively be actuated for exposure of the photosensitive material A. The photosensitive material A can also be exposed in all the three exposure units 1, 2, and 3 for providing an optimum effect.

A first loop station 4 is provided on the pass line B between the photographic picture stationary surface exposure unit 1 and the stationary surface contact exposure unit 2 where the photosensitive material A released from the photographic picture stationary surface exposure unit 1 runs in a loop. The presence of the first loop station 4 permits both the photographic picture stationary surface exposure unit 1 and the stationary surface contact exposure unit 2 to perform exposure operations asynchronously of each other.

Similarly, a second loop station 4a is provided on the pass line B between the stationary surface contact exposure unit 2 and the PLZT line exposure unit 3 where the photosensitive material A released from the stationary surface contact exposure unit 2 runs in a loop.

Denoted by 5 is a magazine in which the photosensitive material A is installed in a roll.

There are provided three transfer roller units 6, 7, and 8 for driving the photosensitive material A along the pass line B.

Finally, a chemical processing unit 9 is arranged at the end of the pass line B, where the photosensitive material A after processed is separated by a cutter (not shown) in to frames which are then recovered in a tray 10.

Figure 2:
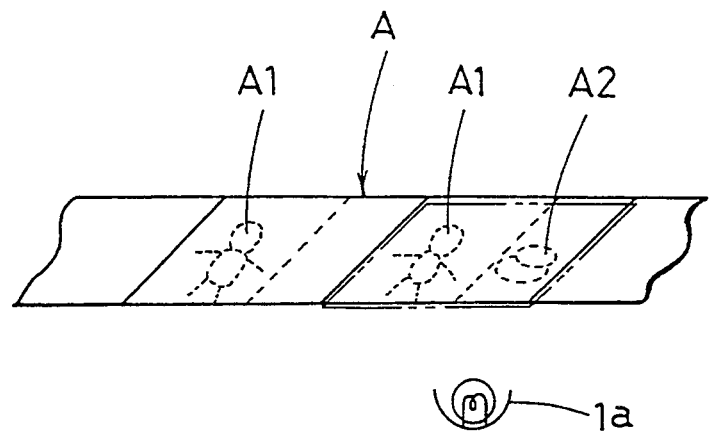
FIG. 2 is a perspective view explaining an exposure operation to a photographic picture in the image combining printer of the present invention.
Figure 6:
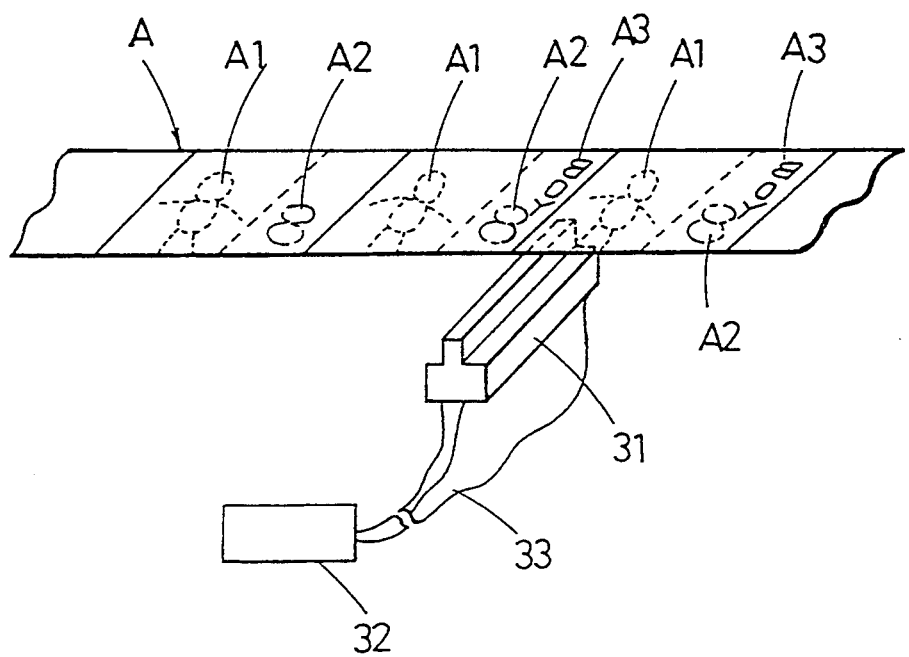
FIG. 6 is a perspective view explaining an exposure operation at the PLZT line exposure unit of the image combining printer of the present invention.

The double exposure action of the image combine printer of the present invention will be explained in a sequence. 1. The photosensitive material A is unloaded from the magazine 5 by the action of the transfer roller unit 6. 2. The photosensitive material A is stopped at the first exposure station 1c of the photographic picture stationary surface exposure unit 1 for position setting and exposed to the photograph image A1 for projection printing, similar to the operation of a conventional image printer (FIG. 2). 3. The photosensitive material A is fed to the first loop station 4 where it runs in a loop. 4. The photosensitive material A is then stopped for position setting at the stationary surface contact exposure unit 2 acting as a second exposure station 2a and exposed to the additional image A2 for contact printing (FIG. 2). 5. The photosensitive material A is fed to the second loop station 4a where it runs in a loop again. 6. As being driven forward across the PLZT line exposure unit 3 by the photosensitive material transfer motor M, the photosensitive material A is line exposed to a further image A3 with the PLZT head 31 (FIG. 6). 7. The photosensitive material A exposed up to three times is transferred to the chemical processing unit 9 where it is processed and separated by the cutter into prints. The finished prints are then recovered in the tray 10.

What is claimed is:

1. An image combining printer comprising:

a photographic picture stationary surface exposure unit for exposing a photosensitive material to an image projected from a negative film by illumination of a light source;

a stationary surface contact exposure unit for conducting a contact exposure on the photosensitive material which stops running and comes into direct contact with another negative; and a PLZT line exposure unit of a linear shape arranged at a right angle to a pass line of the photosensitive material for performing a line exposure;

wherein the photosensitive material can be exposed to light in at least one, a selected two, or all three of the exposure units.

* * * * *